United States Patent
Kobayashi et al.

(10) Patent No.: US 6,237,728 B1
(45) Date of Patent: May 29, 2001

(54) EDDY CURRENT REDUCTION BRAKING SYSTEM

(75) Inventors: Shin Kobayashi; Yukitoshi Narumi, both of Kanagawa (JP)

(73) Assignee: Isuzu Motors Limited (JP)

( * ) Notice: Subject to any disclaimer, the term of this patent is extended or adjusted under 35 U.S.C. 154(b) by 0 days.

(21) Appl. No.: 09/282,881

(22) Filed: Mar. 31, 1999

(30) Foreign Application Priority Data

Mar. 31, 1998 (JP) .................................................. 10-105846

(51) Int. Cl.[7] ...................................................... B60L 7/00
(52) U.S. Cl. ............................. 188/158; 188/161; 310/105
(58) Field of Search ................................. 188/158, 161, 188/164, 267; 310/93, 103, 105, 106, 209; 335/304, 306

(56) References Cited

U.S. PATENT DOCUMENTS

| | | | |
|---|---|---|---|
| 4,937,483 | * 6/1990 | Matsui et al. | 310/105 |
| 5,054,587 | * 10/1991 | Matsui et al. | 188/267 |
| 5,143,183 | * 9/1992 | Kuwahara | 188/158 |
| 5,303,802 | 4/1994 | Kuwahara . | |
| 5,337,862 | * 8/1994 | Kuwahara | 188/158 |
| 5,650,679 | * 7/1997 | Boggs, III et al. | 310/105 |
| 5,804,897 | * 9/1998 | Kuwahara | 310/77 |
| 6,039,157 | * 3/2000 | Yamada et al. | 188/158 |

* cited by examiner

Primary Examiner—Robert J. Oberleitner
Assistant Examiner—Pamela J. Rodriguez
(74) Attorney, Agent, or Firm—John E. Toupal; Harold G. Jarcho

(57) ABSTRACT

A movable magnet support tube and a stationary magnet support tube are aligned coaxially within a brake drum coupled to a rotational shaft. An array of magnets are supported at equal intervals on the outer surfaces of the magnet support tubes and proximal surfaces of ferromagnetic pole pieces are fixed to magnetic pole surfaces at ends of the magnets which are aligned annularly. Extreme end surfaces of the ferromagnetic members are juxtaposed to an inner peripheral surface of the brake drum and an actuator reversibly rotates the movable magnet support tube.

13 Claims, 3 Drawing Sheets

EDDY CURRENT REDUCTION BRAKING SYSTEM

BACKGROUND OF THE INVENTION

The invention relates to an eddy current reduction braking system, which increases both heat dissipation and braking torque.

In a magnet type eddy current reduction apparatus disclosed in Japanese Patent Publication No. 3-86,050 Publication or the like, a magnet supporting tube is reciprocated in an axial direction to switch between braking and non-braking conditions. Such apparatus has the inherent disadvantage of increasing space requirements in the axial direction.

In a magnet type eddy current reduction apparatus disclosed in Japanese Patent Publication No. 7-118,901 Publication or the like, a movable magnet supporting tube is rotated to adjust the relative polarities of magnets axially adjacent in a pair of axially aligned magnet arrays to switch between braking and non-braking conditions. In such an apparatus, however, each pair of N and S-poles of each magnet are directed in a radial direction of the brake drum. It is therefore necessary to process outer and inner surfaces of the magnets into cylindrical or circular form so that an effective magnetic flux is applied to the brake drum via a ferromagnetic plate. The required magnet processing considerably increases cost. Furthermore, the ferromagnetic plates must be large so as to completely cover the magnets in the braking condition. Complete covering by the plates allows the magnets to apply a magnetic field to the brake drum without any substantial leakage. Magnetic flux density cannot be effectively increased to improve braking force therefore due to ferromagnetic plate limitations.

The object of the present invention, therefore, is to provide an eddy current reduction apparatus which is compact in its entirety, and in which braking performance is enhanced.

SUMMARY OF THE INVENTION

The invention is a braking system including a brake drum coupled to a rotational shaft, an immovable magnet supporting tube and a movable magnet supporting tube aligned in an axial direction and disposed coaxially within the brake drum, and an array of permanent magnets supported at equal intervals on an outer peripheral wall of each magnet supporting tube. In addition, proximal surfaces of a pair of ferromagnetic pole pieces are fixed to magnetic pole surfaces at both ends of each magnet. The pole pieces project annularly from each permanent magnet, and extreme end surfaces thereof are juxtaposed to an inner peripheral surface of the brake drum. Motive member actuators reversibly rotate the movable magnet supporting tube to provide braking and non-braking conditions.

According to certain features of the invention, each magnet is supported on its magnet supporting tube with N and S poles oriented annularly and the ferromagnetic pole pieces extend in both the annular direction and in a radially outward direction. In addition, the outer peripheral surfaces of the immovable magnet supporting tube and the movable magnet supporting tube arranged are covered by an extremely thin outer tube portion formed of a non-magnetically permeable material to protect against dust and muddy water.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
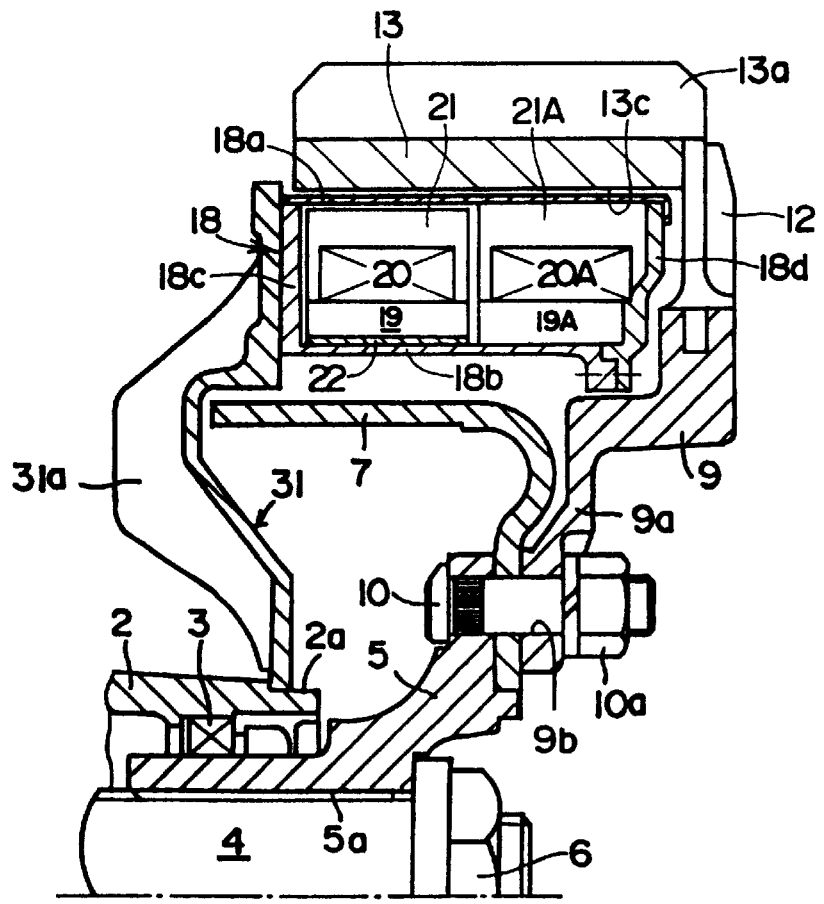
FIG. 1 is a front sectional view of an eddy current reduction braking system according to the invention.

In an eddy current reduction braking system shown in FIG. 1, a brake drum 13 is coupled to a rotational shaft 4. The coupling mechanism includes a mounting flange 5 with a spline hole 5a fitted in the output rotational shaft 4 which is supported by a bearing 3 on an end wall of a gear box 2 of a speed change gear. The shaft 4 projects from the end wall, and is secured by a nut 6. An end wall of a brake drum 7 of a parking brake and a flange portion 9a integral with a wheel 9 for supporting the brake drum 13 are superposed to the mounting flange 5 and secured by a plurality of bolts 10 and nuts 10a.

The brake drum 13 is formed of a material having high magnetic permeability such as iron, and a number of cooling fins 13a are provided at equal intervals on an outer peripheral wall thereof. A proximal end of the brake drum 13 is coupled to a number of supporting arms (spokes) 12 extending in a radial direction from the wheel 9. Interiorly of the brake drum 13 is a coaxially disposed guide tube 18 having a hollow portion 23 (FIG. 2) with a rectangular cross-section. The stationary guide tube 18 is formed of a non-magnetically permeable material such as aluminum and is secured by bolts (not shown) to a frame plate 31 attached to a projecting wall 2a of the gear box 2. Coupled to both ends of an outer tube portion 18a and an inner tube portion 18b of the guide tube 18 are, respectively, annular end wall plates 18c and 18d. In the illustrated embodiment, the end wall plate 18c and the inner tube portion 18b are integrally constituted as a tube body having an inverted L-shape in section, and the end wall plate 18d is coupled to the tube body by means of bolts. Also, the outer tube portion 18a is formed from a thin sheet of non-magnetically permeable material such as a stainless steel.

A movable first support tube 19 and a stationary second support tube 19A are coaxially aligned in an axial direction and are housed in the hollow portion 23 of the guide tube 18. The first support tube 19 is rotatably mounted on the inner tube portion 18b by a bearing 22, and the second support tube 19A is fixed to the inner tube portion 18b. An array of magnets 20, 20A are supported at annularly equal intervals on the outer peripheral walls of the support tubes 19, 19A, respectively.

Figure 2:
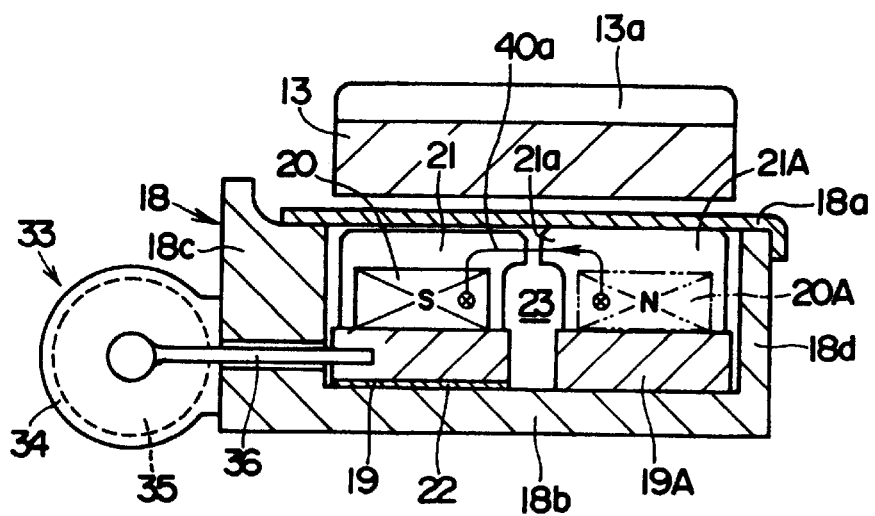
FIG. 2 is a front sectional view showing main parts of the system shown in FIG. 1.
Figure 3:
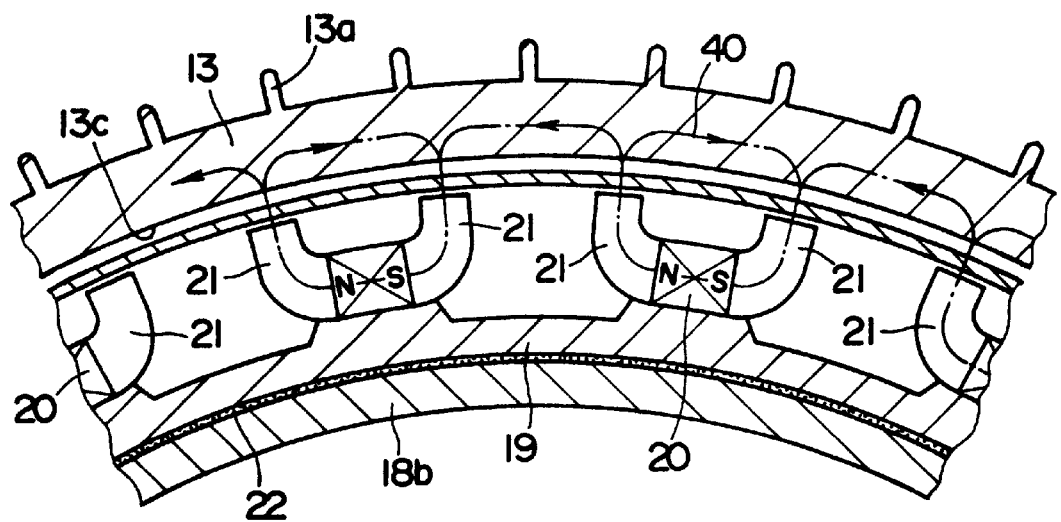
FIG. 3 is a side sectional view showing a braking condition of the system shown in FIG. 1.

As shown in FIG. 3, the magnets 20 of the first support tube 19 form a first ring of magnets having north and south poles oriented annularly and with all N-poles directed counterclockwise. Proximal end surfaces of circular ferromagnetic pole piece members 21, 21A are coupled to magnetic pole surfaces at each end of each magnet 20, 20A. The ferromagnetic members 21, 21A are curved annularly and outwardly in a radial direction and have outer end surfaces juxtaposed to the inner surface 13c of the brake drum 13. Thus, each magnet 20 and its attached pair of ferromagnetic members 21 are substantially U-shaped. In a preferred embodiment, the width of the ferromagnetic members 21, 21A in the axial dimension of the brake drum 13 is somewhat wider than that of the magnets 20, 20A, and the width of the outer ends of the ferromagnetic members 21, 21A is further widened. Preferably, axial projections 21a (FIG. 6) are formed at the outer ends of the ferromagnetic members 21, 21A so as to reduce the spacing between axially adjacent members as shown in FIG. 2.

A plurality of motive actuators 33 (FIG. 2) are supported at peripherally equal intervals on a frame plate 31 (FIG. 1) having a reinforcing rib 31a. In each actuator 33, a piston 35 is fitted in a cylinder 34 to define a pair of fluid pressure chambers, and an arm 36 projects into the hollow portion 23 via a slot in the end wall 18c of the guide tube 18. The arm 36 is operatively connected between the piston rod and the movable first support tube 19.

As shown in FIG. 3, during braking, the magnets 20 of the first support tube 19 are axially lined up with the magnets 20A of the second support tube 19A. As the rotating brake drum 13 crosses the magnetic flux applied to the inner surface 13c via the ferromagnetic members 21, 21A, eddy currents are generated in the brake drum 13 producing braking torque. That result is caused by magnetic circuits 40 formed between the magnets 20, 20A and the brake drum 13, as shown in FIG. 3.

Figure 4:
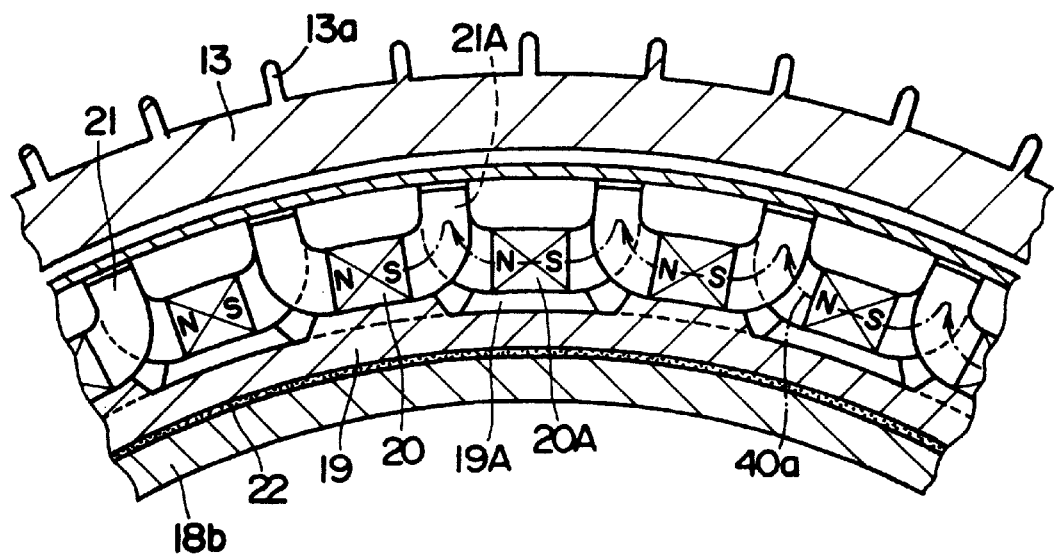
FIG. 4 is a side sectional view showing a non-braking condition of the system shown in FIG. 1.

In a non-braking condition, the first support tube 19 is rotated by a half pitch of the magnets 20 providing the relative magnet positions shown in FIG. 4. In those positions, the magnets 20, 20A apply no magnetic flux to the brake drum 13, and a braking torque is not generated. That is, as shown in FIGS. 2 and 4, the ferromagnetic members 21 extending from the S-poles of the magnets 20 are axially aligned with the ferromagnetic members 21A extending from the N-poles of the magnets 20A, and the ferromagnetic members 21 extending from the N-poles of the magnets 20 are axially aligned with the ferromagnetic members 21A extending from the S-poles of the magnets 20A. Consequently, magnetic short circuits 40a are formed which comprise N-poles of magnets 20, ferromagnetic members 21, ferromagnetic members 21A, S-poles of magnets 20A, N-poles of magnets 20A, ferromagnetic members 21A, ferro-magnetic members 21 and S-poles of magnets 20. Because of the combination of block-like magnets and ferromagnetic members into a substantially U-shaped form, magnetic flux leakage is minimized to provide in the brake drum 13 an effective magnetic circuit and resultant enhanced braking performance.

Figure 5:
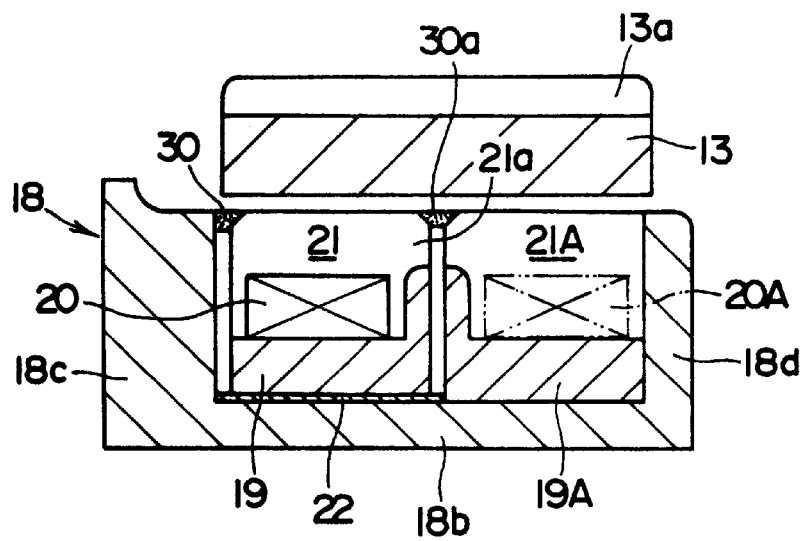
FIG. 5 is a front sectional view showing main components of another braking system embodiment of the invention.
Figure 6:
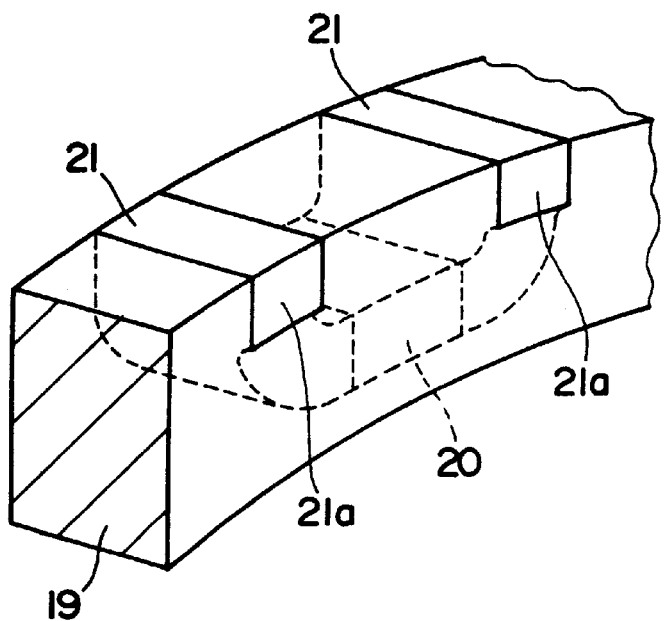
FIG. 6 is a perspective view of a magnet support tube of the system shown in FIG. 5.

In the embodiments shown in FIGS. 5 and 6, the movable first support tube 19, the magnets 20, and the ferro-magnetic members 21 are cast integrally in a non-magnetically permeable material such as aluminum to provide a tube body having a rectangular section. Similarly, the stationary second support tube 19A also is cast integrally with the magnets 20A, the ferromagnetic members 21A, and the end wall plate 18d of the guide tube 18. In addition, the outer tube sheet portion 18a is replaced by an annular seal member 30 between the end wall plate 18c of the guide tube 18 and the first support tube 19, and a seal member 30a between the first magnet support tube 19 and the second support tube 19A. The seals 30 and 30a prevent dust and muddy water from entering the guide tube 18, thus insuring smooth movement of the first support tube 19. However, an outer tube portion 18a formed from a non-magnetically permeable thin sheet still may be coupled to the guide tube 18 to prevent access of dust and muddy water, similar to the embodiments shown in FIGS. 1 to 4.

While in the above-described embodiments, an eddy current reduction apparatus of the type in which an immovable magnet support tube and a movable magnet support tube are disposed interiorily of a brake drum, and a movable magnet support tube is rotated to switch between a braking and non-braking position, tubes are arranged in an axial direction and a non-braking position in which the magnets of both the magnet support tubes are biased in a peripheral direction by a half arranging pitch, it is to be noted that the present invention is not limited thereto. The invention also can be used in an eddy current reduction system of the type in which a magnet support tube is reciprocated in an axial direction relative to a brake drum to switch between braking and non-braking positions. In braking positions, the magnets are juxtaposed to an inner surface of the brake drum and in non-braking positions are separated axially therefrom.

Obviously, many modifications and variations of the present invention are possible in light of the above teachings. It is to be understood, therefore, that the invention can be practiced otherwise than as specifically described.

What is claimed is:

1. A vehicle braking system comprising:
    a magnetically permeable rotatable brake drum defining an annular inner drum surface;
    a drive shaft rotatably coupled to said brake drum;
    annular support means mounted within said brake drum;
    a plurality of permanent magnets mounted on said support means and spaced apart in an annular array juxtaposed to said inner drum surface, each of said magnets having a pair of opposing north and south poles aligned with said array;
    motive means for producing movement of said support means between braking and non-braking positions; and
    a pole piece attached to each of said poles; and wherein each of said pole pieces is curved and projects from each of said poles annularly and toward said inner drum surface.

2. A system according to claim 1 wherein each said permanent magnet and attached pole pieces have a U-shape with ends facing said inner drum surface and, each of said pole pieces has an axially directed width greater than said permanent magnets and axially directed outer ends.

3. A system according to claim 1 wherein said array comprises axially aligned first and second rings of said spaced apart permanent magnets, and said motive means produces relative rotational movement between said first and second rings of said permanent magnets.

4. A system according to claim 3 wherein said support means comprises a rotatable first tube coupled to said motive means and having an outer surface supporting said first ring of said permanent magnets, and a fixed second tube having an outer surface supporting said second ring of said permanent magnets.

5. A system according to claim 4 wherein each said permanent magnet and attached poles pieces have a U-shape with ends facing said inner drum surface and, each of said pole pieces has an axially directed width greater than said permanent magnets and axially directed outer ends.

6. A system according to claim 4 wherein said first tube and said first ring of said permanent magnets are cast as an integrated unit, and said second tube and said second ring of permanent magnets are cast as an integrated unit.

7. A system according to claim 4 wherein said support means further comprises an annular guide tube having a substantially rectangular cross-section, and said guide tube supports said first and second tubes.

8. A system according to claim 7 including a thin sheet of non-magnetically permeable material covering said guide tube.

9. A system according to claim 1 wherein each said pair of opposing north and south poles have the same annular orientation.

10. A system according to claim 9 wherein each said permanent magnet and attached pole pieces have a U-shape with ends facing said inner drum surface and, each of said pole pieces has an axially directed width eater than said permanent magnets and axially directed outer ends.

11. A system according to claim 9 wherein said array comprises axially aligned first and second rings of said spaced apart permanent magnets, and said motive means produces relative rotational movement between said first and second rings of said permanent magnets.

12. A system according to claim 11 wherein said support means comprises a rotatable first tube coupled to said motive means and having an outer surface supporting said first ring of said permanent magnets, and a fixed second tube having an outer surface supporting said second ring of said permanent magnets.

13. A system according to claim 12 wherein each said permanent magnet and attached pole pieces have a U-shape with ends facing said inner drum surface and, each of said pole pieces has an axially directed width greater than said permanent magnets and axially directed outer ends.

* * * * *